Patented Sept. 21, 1937

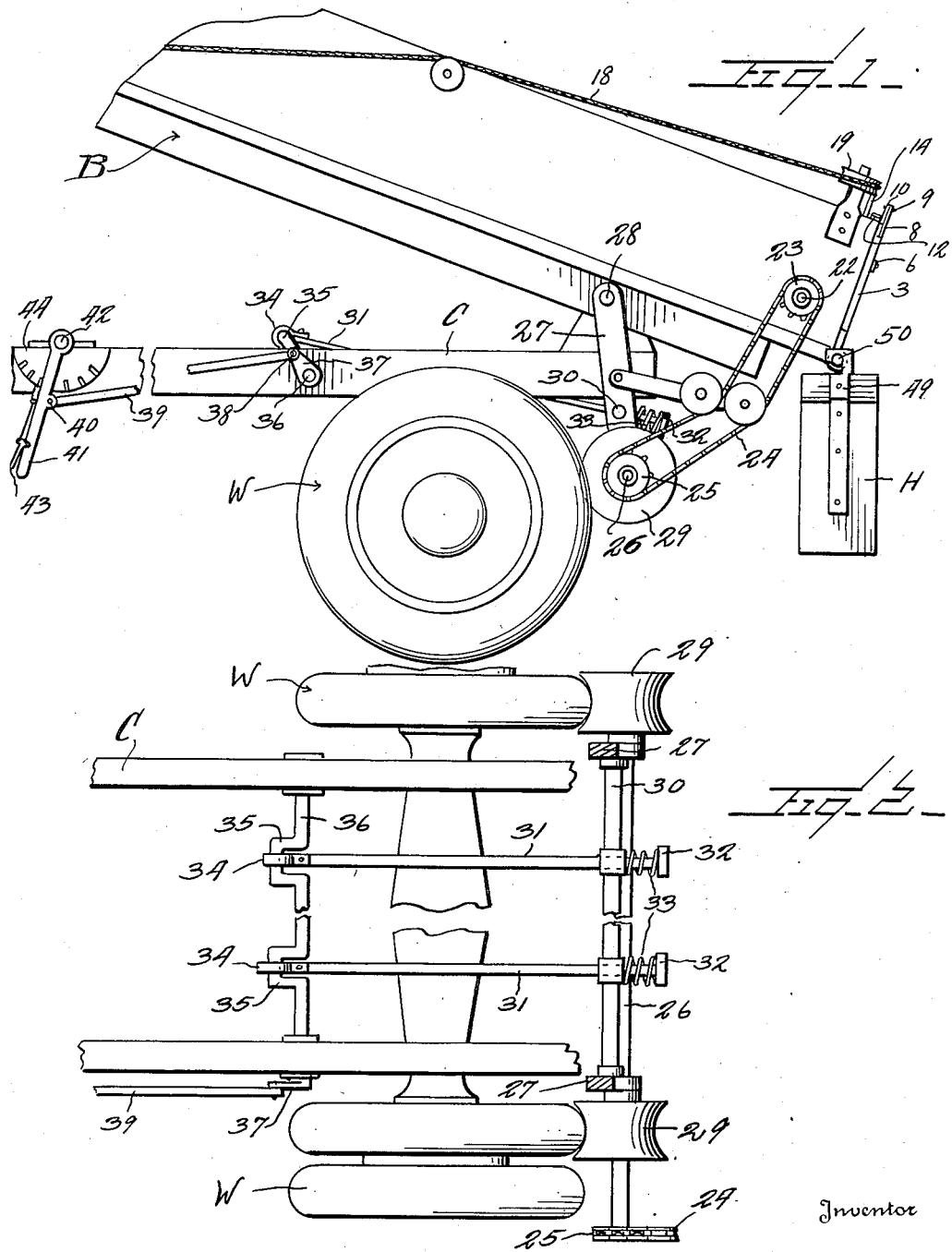

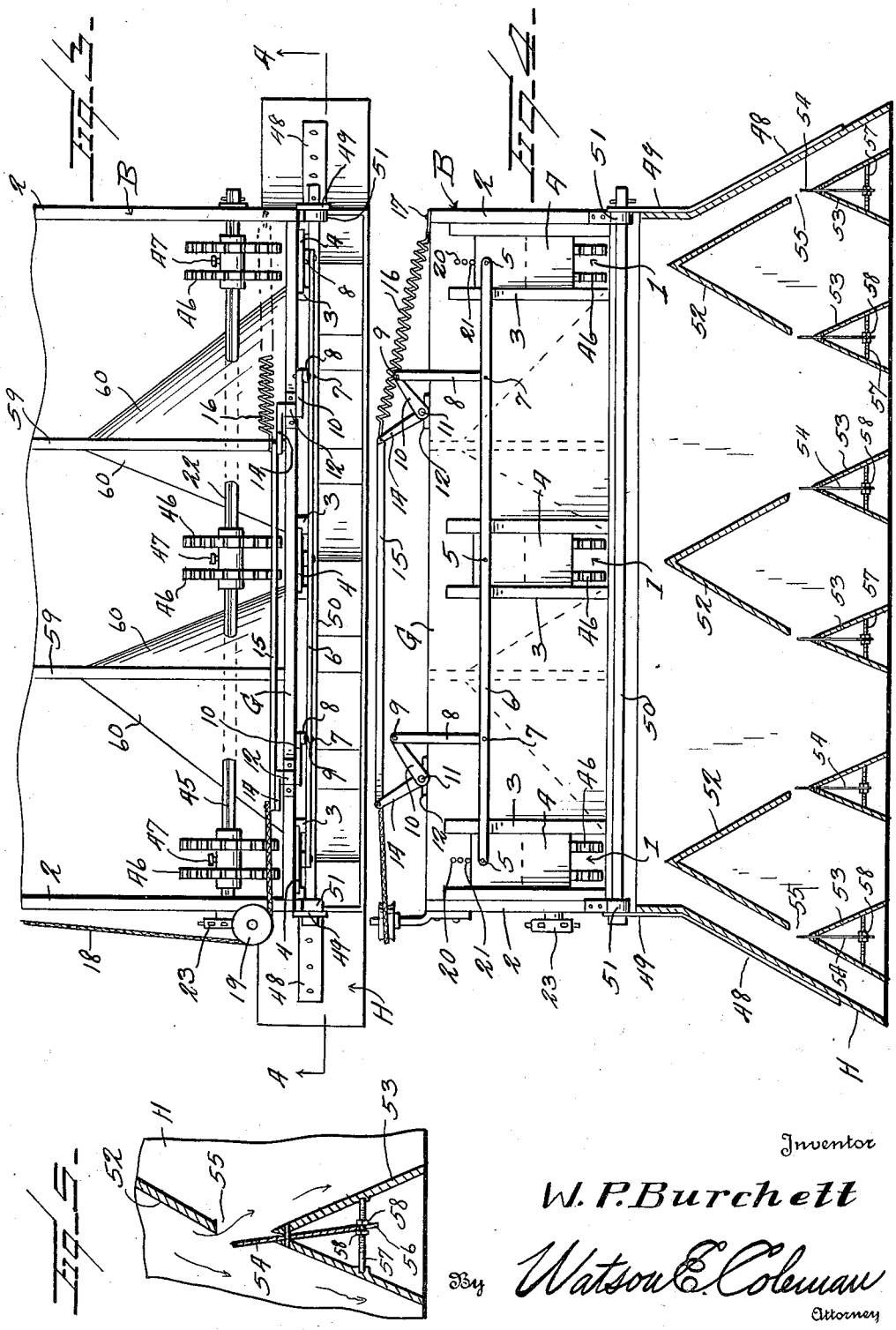

2,093,953

UNITED STATES PATENT OFFICE 2,093,953

SPREADING APPARATUS

Wilford P. Burchett, Olive Hill, Ky.

Application November 21, 1935, Serial No. 50,979

6 Claims. (Cl. 275—14)

This invention relates to spreading apparatus, and it is an object of the invention to provide an apparatus of this kind to be used in the spreading of lime and other material of a fluent character.

The invention also has for an object to provide an apparatus of this kind which can be detachably applied to a vehicle and more particularly to a dumping body of the vehicle.

It is also an object of the invention to provide an apparatus of this kind including a spreading hopper having means whereby the hopper may be pivotally connected to the tail end of a dumping body and in a position to receive the material as discharged from the dumping body and wherein means is provided within the hopper to effect and assure the desired spreading of the material.

The invention consists in the details of construction and in the combination and arrangement of the several parts of my improved spreading apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating an apparatus constructed in accordance with an embodiment of my invention and in applied position, the associated wagon body being in tilted position;

Figure 2 is a fragmentary view partly in plan and partly in section illustrating a mechanism as herein disclosed for adjusting the driving means for the agitator members carried by the wagon body;

Figure 3 is a view in top plan of the tail end portion of a wagon body and the applied spreading hopper;

Figure 4 is a view in rear elevation of the structure as illustrated in Figure 3 with the spreading hopper in vertical section, such line of section being substantially on the line 4—4 of Figure 3;

Figure 5 is an enlarged sectional view illustrating in detail the mounting of one of the material regulating blades arranged within the spreading hopper.

As disclosed in the accompanying drawings, C denotes the chassis or frame of a vehicle of any desired type and upon which is mounted for tilting movement the body B. This body B is adapted to contain lime or other fluent material to be distributed and initially the vehicle with which my improved attachment is to be employed is used to transport the material from the source of supply to the field or other location over which the material within the body is to be spread.

The tail gate or rear end wall G of the body B is provided in its lower portion with the spaced discharge openings 1. As particularly illustrated in Figure 4, these openings 1 are three in number with the intermediate opening at substantially the transverse center of the body B and with the remaining two openings immediately adjacent to the side walls 2 of the body. Each of these openings 1 at opposite sides thereof is provided with the vertically disposed trackways 3 between which is slidably mounted a valve plate or gate 4 for regulating the flow of material within the body B out through said opening 1.

Common to all three of the valve plates or gates 4 and operatively connected thereto at 5 is an elongated bar 6. Pivotally connected, as at 7, to this bar 6 at the outer portions thereof are the upstanding levers 8 which also have their upper end portions pivotally connected, as at 9, to the rock arms 10. These arms 10 are carried by a shaft 11 rotatably mounted upon the upper edge of the tail gate or wall G as is particularly indicated at 12 in Figure 3. These shafts 11 also carry additional rock arms 14 which are operatively connected by a bar 15 whereby the arms 14 are moved in unison and in the same general direction resulting in the desired movements of the arms 10 to raise or lower the plates or gates 4 as may be desired.

One end portion of the bar 15 has secured thereto an extremity of a retractile member or spring 16, the opposite extremity of which being anchored, as at 17, to the adjacent side wall 2 of the body B. This member or spring 16 operates to provide automatic means for moving the bar 15 to effect a downward adjustment of the plates or gates 4. The opposite end portion of the bar 15 has secured thereto an end portion of a flexible member 18 which is disposed about a guide pulley 19 mounted upon the adjacent side wall 2 of the body B. This member 18 extends from the guide pulley 19 forwardly to a point readily accessible by the operator of the vehicle. By imposing pull on the member 18 the valve plates or gates 4 may be caused to have upward opening movement to the extent desired dependent upon the size of the material streams to be discharged through the openings 1. The gate or end board G adjacent to certain of the valve plates or gates 4 is provided with the vertical series of openings 20. Into the openings of each series is adapted to be selectively inserted a pin or key 21 to provide means for positively limiting the extent of upward opening movement of the plates or gates 4.

Rotatably supported by the side walls 2 of the body B closely adjacent to the applied tail gate or board G is a shaft 22. This shaft is freely insertable through the side walls 2 of the body so that the same can be readily removed or applied as desired. This shaft 22 extends a slight distance beyond the walls 2 of the body and to an extended portion of the shaft is fixed a sprocket wheel 23 around which passes a chain 24 also passing around a sprocket 25 fixed to a second shaft 26. This shaft 26 is rotatably supported by the arms 27 depending from the opposite sides of the dump body B with their upper end portions pivotally connected, as at 28 to said body. The shaft 26 has fixed thereto friction pulleys 29 which, upon swinging movement of the arms 27 in one direction, are brought into contact with the rear wheels W of a vehicle so that the shaft 26 may be driven from said wheels W to effect the desired rotation of the shaft 26. The arms 27 are also connected by a bar 30 to further assure the desired unitary swinging movement of the arms 27 and freely disposed through the central portion of the bar 30 are the parallel bars 31 extending in a direction lengthwise of the chassis C. These bars 31 extend rearwardly beyond the bar 30 with their rear extremities provided with the enlargements or heads 32. Interposed between these heads 32 and the bar 30 are the expansible members 33 herein disclosed as coiled springs encircling the portions of the bars 31 rearwardly of the bar 30.

The forward end portions of the bars 31 are operatively connected, as at 34, with the cranks 35 carried by a shaft 36. This shaft 36 extends transversely of the chassis C and is rotatably supported thereby. One end portion of the shaft 36 extends beyond the side of the chassis C and fixed to such extended portion is a rock arm 37. Pivotally connected, as at 38, to this rock arm 37 is an elongated arm 39 which in turn is pivotally connected, as at 40, to a swinging lever 41 depending from the chassis C and having its upper portion pivotally connected, as at 42, with the chassis. As illustrated in Figure 1, the lever 41 carries a conventional latch mechanism 43 coacting in a well known manner with the rack 44 mounted upon the chassis C whereby the lever 41 is effectively locked in position in accordance with the desired adjustment of the arms 27. I wish to state at this time that any other suitable means may be employed for holding this lever 41 in desired adjustment as may be suited for the purpose.

The shaft 22 has extending entirely therealong a keyway 45 which permits the ready application to said shaft of the agitators 46, the hubs of which having keys seating within said keyway 45 in a well known manner and for which reason it is not believed a detailed illustration thereof is required. The agitators 46 may be as preferred and when applied are arranged immediately adjacent the several openings 1. These agitators 46 are of especial importance when the material, such as lime, is of a lumpy character and, therefore, does not flow as freely out through the openings 1 as may be desired.

By having the keyway 45 extending from end to end of the shaft 22 it is believed to be readily apparent that the shaft 22 may be readily withdrawn from applied position when desired and, of course, the mounting of the shaft 22 together with the agitators 46 may be effected with equal facility. It is particularly desirable to provide for this ready removal and application of the shaft 22 and the agitators 46 because generally the material to be spread is of a character not requiring these agitators 46.

The agitators may also be held in desired position upon the shaft 22 by the binding screws 47 and which screws particularly serve to prevent the agitators after being set from having longitudinal displacement along the shaft 22.

Again referring to the flexible member 18, it is to be stated that after the same has been pulled to effect the desired raising of the valve plates or gates 4 said member may be tied to a cleat or other member within the cab or otherwise as may be preferred. It is to be stated that when the loaded vehicle is travelling from the source of supply to its destination the valves or gates 4 are to be closed and during a spreading operation it is generally desired to have the gates or valves closed when the vehicle makes an abrupt turn. By releasing the flexible member or line 18 the spring 26 will operate to turn the valve members or gates 4 to a closed position and, of course, the driver or other operator of the vehicle while the vehicle is in motion can impose the desired pull upon the member 18 to open the valves or members 4.

The spreading hopper H is constructed of any desired material and is open at its top and bottom. This hopper is also relatively narrow and is of a length at its top substantially equal to the width of the vehicle body. The lower portion of the hopper H at its ends flares outwardly, as at 48. The end walls of the hopper H have secured thereto the upstanding brackets 49 through which are freely insertable a rod 50 which in turn is freely insertable through bearings 51 carried by the floor of the body B at the rear portion thereof. This rod 50 together with the brackets 49 provide means whereby the hopper H is supported in applied position by the rear or tail end portion of the body B and in a manner whereby the hopper H is free to swing so that by gravity the hopper H will at all times maintain substantially a vertical position irrespective of the adjustment of the body B. The upper portion of the hopper H is intersected at spaced points therealong by the V-shaped partitions 52, the apices of which being upwardly disposed. These partitions 52, as particularly illustrated in Figure 4, are three in number and are so arranged within the hopper H to bring the apices thereof below substantially the transverse center of the openings 1 so that the streams of material discharged through the openings 1 will be divided by the partitions 52. Below the lower or free ends of the partitions 52 are provided the supplemental V-shaped partitions 53, the apices of which being also upwardly disposed but spaced from the lower or free extremities of the partitions 52.

Extending freely up through the apex of each of the partitions 53 is a plate 54 of a length to bridge the space between the side walls of the hopper H and said plate extends a major distance across the space 55 between the apex of its partition 53 and the associated lower or free end of the partition 52 thereabove. This plate 54 is adapted to have a rocking adjustment with the apex portion of the partition 53 as its fulcrum. This plate 54 provides a means to further subdivide the stream of material flowing over the associated portion or face of the adjacent partition 52 to effect the required spreading of the material.

The adjustment of the plate 54 is dependent upon the thickness of the stream of material discharged thereupon from the partition 52 thereabove. The thicker the stream flowing upon the plate 54 the farther said plate at its upper edge is adjusted outwardly from the coacting face of the associated partition 52 and vice versa. The idle adjustment of the plate 54 is to assure substantially an equal division of material flowing over the opposite faces of the partition 53.

The lower marginal portion of the plate 54 is provided with a notch or open slot 56 to permit said lower portion of the plate to straddle the threaded shank 57 interposed between and supported by the downwardly diverging plates of the partition 53. Threaded upon this shank 57 at opposite sides of the plate 54 are the nuts 58 which provide means whereby the plate 54 is effectively maintained in its desired adjustment and more particularly the upper edge thereof. The rod 50 may be readily applied or removed so that the hopper H can be placed upon the body B or taken therefrom as required. By having the hopper H readily detachable a single hopper can be employed in connection with a number of vehicles and which is particularly desirable when the working operation is any considerable distance from the source of supply of the material to be spread. Upon arrival of a loaded vehicle the hopper H can be readily applied and after the load has been distributed the attachment can be quickly removed for placement upon another vehicle.

The body B is provided therealong with a plurality of partitions 59 which divide the body into a plurality of compartments with each of which an opening I communicates. These partitions 59 serve to maintain the load against undue agitation or shifting when the vehicle is in transit and thus materially facilitating the desired spreading action. I also find it of advantage to provide the rear end portions of the partitions 59 and the adjacent tail gate or board G with the downwardly slanting plates 60 which terminate adjacent to the openings I and thus provide means to prevent any considerable amount of the material being lodged to one side of each of said openings.

From the foregoing description it is thought to be obvious that a spreading apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A spreader attachment for the dumping body of a vehicle comprising a hopper open at its top and bottom, means for freely connecting the hopper to the tail end portion of the dumping body to receive the contents of the body when discharged therefrom, said mounting permitting the hopper to maintain at all times when applied to the body a substantially vertical position, a series of V-shaped partitions within the upper portion of the hopper, the apices of said partitions being upwardly disposed whereby said partitions divide into streams the material discharged into the hopper from the body, supplemental V-shaped partitions within the hopper adjacent the lower or discharge ends of the first partitions and spaced therefrom, the apices of the supplemental partitions being also upwardly disposed to divide the material into further streams, and a plate adjustably carried by the apex portion of each of the supplemental partitions and adjustable with respect to the first named partitions to regulate the dividing of the material as it is discharged from the first named partitions upon the second named partitions.

2. A spreader attachment for the dumping body of a vehicle comprising a hopper open at its top and bottom, means for freely connecting the hopper to the tail end portion of the dumping body to receive the contents of the body when discharged therefrom, said mounting permitting the hopper to maintain at all times when applied to the body a substantially vertical position, a series of V-shaped partitions within the upper portion of the hopper, the apices of said partitions being upwardly disposed whereby said partitions divide into streams the material discharged into the hopper from the body, supplemental V-shaped partitions within the hopper adjacent the lower or discharge ends of the first partitions and spaced therefrom, the apices of the supplemental partitions being also upwardly disposed to divide the material into further streams, and means to regulate the dividing of the material as it is discharged from the first named partitions upon the second named partitions.

3. A spreader attachment for the dumping body of a vehicle comprising a hopper open at its top and bottom, means for freely connecting the hopper to the tail end portion of the dumping body to receive the contents of the body when discharged therefrom, said mounting permitting the hopper to maintain at all times when applied to the body a substantially vertical position, a series of V-shaped partitions within the upper portion of the hopper, the apices of said partitions being upwardly disposed whereby said partitions divide into streams the material discharged into the hopper from the body, supplemental V-shaped partitions within the hopper adjacent the lower or discharge ends of the first partitions and spaced therefrom, the apices of the supplemental partitions being also upwardly disposed to divide the material into further streams, a plate adjustably carried by the apex portion of each of the supplemental partitions to regulate the dividing of the material as it is discharged from the first named partitions upon the second named partitions, said plates in their adjustment being laterally moved, and means for positively holding said plates in their selected adjustments.

4. A spreading attachment for the dumping body of a vehicle comprising a hopper open at its top and bottom, means for supporting the hopper from the body to receive the contents of the body when discharged therefrom, a series of V-shaped partitions within the upper portion of the hopper with the apices thereof upwardly disposed to cause said partitions to divide into streams the material discharged into the hopper from the body, supplemental V-shaped partitions within the hopper adjacent the lower or discharge ends of the first named partitions, the apices of the supplemental partitions being upwardly disposed to divide the material into further streams, and means coacting with the apex portions of the supplemental partitions to regulate the dividing of the material as it is discharged from the first named partitions upon the second named partitions.

5. In a spreader attachment comprising a hopper open at its top and bottom, a series of V-shaped partitions within the upper portion of the hopper, the apices of said partitions being upwardly disposed whereby said partitions divide into streams the material discharged into the hopper, supplemental V-shaped partitions within the hopper adjacent the lower or discharge ends of the first partitions and spaced therefrom, the apices of the supplemental partitions being also upwardly disposed to divide the material into further streams, and means to regulate the dividing of the material as it is discharged from the first named partitions upon the second named partitions.

6. In a spreader attachment comprising a hopper open at its top and bottom, a series of V-shaped partitions within the upper portion of the hopper, the apices of said partitions being upwardly disposed whereby said partitions divide into streams the material discharged into the hopper, supplemental V-shaped partitions within the hopper adjacent the lower or discharge ends of the first partitions and spaced therefrom, the apices of the supplemental partitions being also upwardly disposed to divided the material into further streams, plates extending upwardly through the apex portions of the supplemental partitions, said plates having lateral swinging movement, and means for holding the plates in desired selective adjustments, said plates providing means to regulate the dividing of the material as it is discharged from the first named partitions upon the second named partitions.

WILFORD P. BURCHETT.